Dec. 2, 1969  A. F. FARR  3,481,477
APPARATUS FOR FILTERING OUT CLEAR LIQUID FROM SUSPENDED SOLIDS
Filed March 2, 1965
FIG. 1.
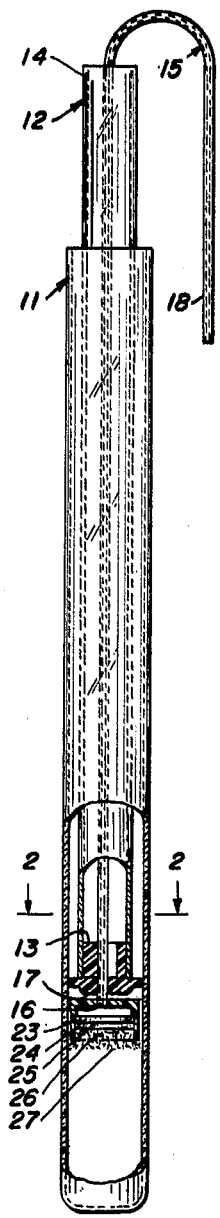
FIG. 2.
FIG. 3.
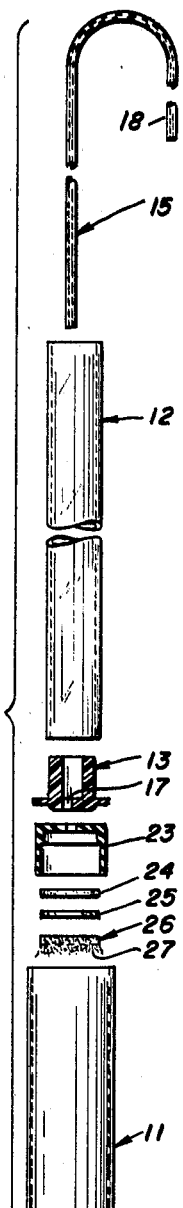
FIG. 4.
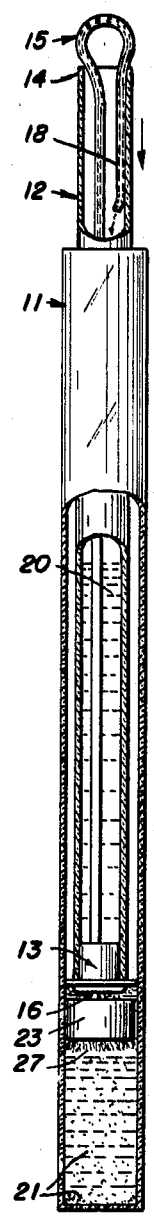
FIG. 5.
FIG. 6.
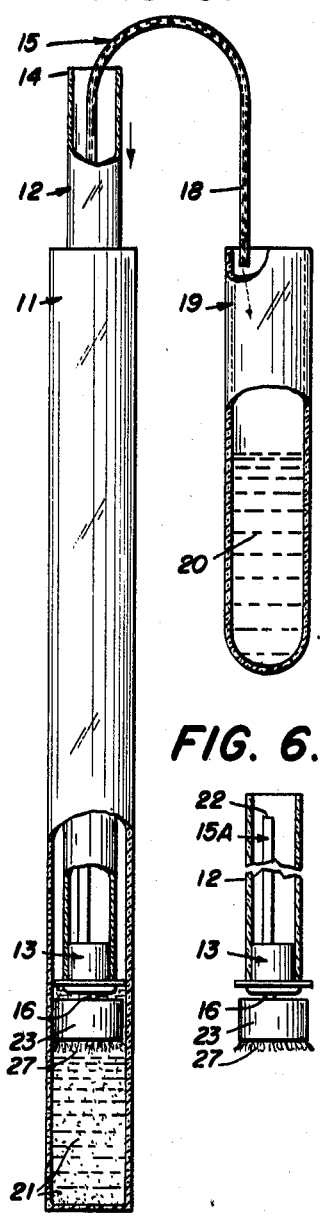
FIG. 8.
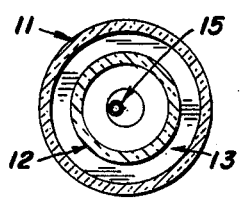
FIG. 7.
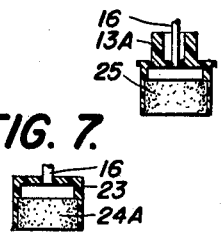
INVENTOR
ANDREW F. FARR
BY
ATTORNEY

United States Patent Office 3,481,477
Patented Dec. 2, 1969

3,481,477
APPARATUS FOR FILTERING OUT CLEAR LIQUID FROM SUSPENDED SOLIDS
Andrew F. Farr, 8620 San Antonio Ave., South Gate, Calif. 90280
Filed Mar. 2, 1965, Ser. No. 436,570
Int. Cl. B01d 35/02
U.S. Cl. 210—359          7 Claims

ABSTRACT OF THE DISCLOSURE

Apparatus and method for using same to filter a liquid which is contained in a tube. The filtering step is carried out in situ by moving a tube into a tubular container. A filter is interposed between the tube being moved into the tubular container and the liquid material located in the container. By suitable sealing means around the tube having the filter portions, all the liquid in the container must pass through the filter as pressure is applied to the liquid in the container. The separated liquid is then passed through the filter into the tube and may be transported therefrom.

---

This invention relates to a method and apparatus for filtering out clear liquid from a liquid-solid suspension, particularly small samples for chemical analysis.

One object of the invention is to provide a method and means for quick and easy separation of a liquid from samples of a liquid-solid suspension for purposes of chemical analysis. Another object is to provide expeditious means for filtering out deproteinized blood serum from suspended denatured proteins in samples for analysis without the necessity of settling the denatured proteins by centrifuging. Still another object is to provide means and method for filtering out liquids from solid-liquid suspensions while simultaneously adding chemical, biological or color indicator reagents to the filtered-out liquid.

These and other objects are attained by my invention, which will be understood from the following description, reference being made to the accompanying drawings in which FIG. 1 is a side-elevational view of an assembled filtration apparatus with parts broken away to show in section the interior construction;

FIG. 2 is a cross-sectional view taken on the line 2—2 of FIG. 1;

FIG. 3 is a side-elevational view of the same shown in disassembly, with certain parts broken away and shown in section;

FIG. 4 is a diagrammatic representation of the filtering apparatus in use showing the delivery of the filtered out liquid to the upper chamber of the apparatus for temporary storage therein;

FIG. 5 is a diagrammatic representation of the apparatus in another use showing delivery of clear filtrate to another vessel;

FIG. 6 is a side-elevational view of an alternative arrangement of the plunger tube and filter assembly with a shortened delivery tube discharging clear filtrate directly within the plunger tube;

FIG. 7 is a side-elevational view partly in section, showing an alternative arrangement of the filtering cup; and FIG. 8 is an integral form of piston head and filter cup.

The method and apparatus of this invention is particularly adapted for use in the examination of blood samples in a clinical laboratory, and its use will be described in particular for this purpose. It will be understood that the invention may be used for separating other liquid-solid suspensions, and for other purposes as will be later explained.

In the examination of blood specimens in a clinical laboratory, it is frequently necessary to examine a protein-free sample of blood serum after separation from the suspended cellular material, and after further precipitation and separation of proteins. For this purpose it is customary to subject the tubes in which the blood samples are delivered to the laboratory, to centrifugal force to cause the settling of the cells to the bottom of the tube. The supernatant serum or plasma is then removed and treated chemically to cause protein precipitation. The treated sample is centrifuged a second time to settle the denatured proteins and the supernatant fluid is removed for further processing. In certain clinical laboratories, hundreds of tube samples of blood are handled per day, and it is important to conserve time and retain completely accurate identification (by attached labels) of each sample.

The relatively large amount of time required to subject the sample to a second centrifugation is avoided entirely by the use of the pressure filtration method and apparatus of this invention.

In FIG. 1 there is shown an assembled filtration apparatus consisting of an outer tubular member 11, which is a sample tube similar to that in which the blood sample was delivered to the laboratory. This tube contains blood serum or plasma which has been treated chemically to denature and precipitate the dissolved proteins which are normally present. A plunger tube 12 having a soft rubber piston head 13 attached to its inner end is arranged to be moved longitudinally within and slidingly fitting the inside wall of the member 11, the plunger tube 12 being considerably longer than the tube 11 to provide handle means. The outer end 14 of the plunger tube 12 is open, and there is provided within said tube a plastic flexible small bore or capillary tube 15, whose lower end 16 extends through an opening 17 provided in the piston head 13, and whose opposite outer end 18 may extend beyond the open end 14 of the plunger tube 12, although it may terminate within the plunger tube if desired. The outer end portion 18 of the flexible tube 15 may be doubled back into the plunger tube 12 (as shown in FIG. 4) or it may be free to communicate with another receiving vessel 19.

On the lower end 16 of the small bore or capillary tube 15 there is mounted a filtering cap 23, which is preferably made of pliable rubber, although rigid material may also be used. Within the cup 23 there is provided a filtering medium, preferably one or more compact pads 24 and 25 of glass-wool, asbestos, or synthetic plastic fibers. Porous ceramic or other inert inorganic filtering materials such as sintered glass, diatomaceous silica and the like may also be used.

In the preferred construction shown, a more or less open textured plug 26 is provided at the entrance end of the cup 23, with hair-like fiber ends 27 extending outwardly. These fiber ends 27 serve to entrap the suspended particles which are to be filtered out and prevent the formation of an impenetrable filter-cake on the filtering media pads.

An alternative structure for the filtering cup is shown in FIG. 7 in which a rigid filtering tablet 24A is inserted in the pliable filter cup 23, with the open end of the delivery tube 16 disposed in the cup above the tablet 24A.

The piston head and the filtering cup may also be made as an integral unit 17A as shown particularly in FIG. 8.

The method of separating suspended material from the filtrate sample, for example, the serum-protein mixture contained in tube 11, consists in inserting the plunger tube 12 with the piston head 13 and the attached filter cup 23 into the tube 11, the capillary tube 15 communicating through the piston head 13 and into the closed end portion of the filter cup 23. The filter cup 23 is preferably smaller in diameter than the inside of the tube 11 so that the liquid suspension may flow around it. Upon gently pressing the plunger tube 12 against the contained liquid-solid suspension in the outer tube 11, the filtered serum flows out through the tube 16 after passing through the filtering medium in the filter cup 23. The solid particles collect on the filtering surface. If the upper extension 15 of the tube 16 is doubled back so as to discharge into the plunger tube 12, as shown in FIG. 4, the clear filtered serum is collected therein, and may be kept therein until required for analysis. Alternatively the filtered serum may be delivered by the extension tube 15 to another vessel 19 as shown in FIG. 5.

In an alternative arrangement, the capillary tube 15A may terminate inside the plunger tube 12 as shown in FIG. 6 which arrangement the filtered serum is collected directly in the plunger tube 12, from which it may be removed by pouring or in any other convenient manner.

After the filtration has been completed, and the separated serum is no longer retained in the plunger tube 12, this tube with the piston head 13, capillary tube 15 and filter cup 23 and contents may be discarded, since the apparatus is inexpensive and expendible, thus avoiding the uncertainty of washing and sterilizing, and the recharging of the filtering tablets.

The tube 11 is generally cleansed and re-used for new blood samples, but if desired the entire apparatus may be discarded after a single use.

While the use of the apparatus has been described with reference to the filtration and collection of blood serum, the apparatus has other uses. It may advantageously be used for separating the clear liquid from any suspension of solid in liquid, as required in many types of analytical procedures.

The filtering tablets 24 and 25, or one of them, may be impregnated with a reagent chemical, or dye indicator, or an innoculant; or a compact but porous reagent tablet may be substituted for a filter tablet, and the filtrate will then automatically be treated with the reagent as it passes through the filter cup. For example, the innermost tablet 24 as shown in the drawings may be composed of an ion exchange resin which removes sodium ion from the filtrate as it passes through the cup 23.

Where the descriptive word "capillary" is used herein it refers to small-bore pliable plastic tubing having a bore of about 1/16 inch.

The advantages of the method and use of the apparatus will be apparent from the above description. The saving in handling time for making the separations, and the avoidance of re-labeling of the temporarily stored serum, avoid the danger of mislabeling, and make the invention useful in analytical examinations.

The objectives stated in the beginning have been attained.

I claim:
1. An apparatus for separating a clear liquid from suspended solids in the liquid comprising an outer tubular member; a plunger tube longitudinally movable within said outer member; a piston head mounted on the inner end of said plunger tube, said piston head making sliding sealing contact with the inner walls of said outer tubular member; a filtering means disposed forwardly of said piston head; said filtering means being a tubular elongated body of outer cross-sectional diameter smaller than the inner diameter of the outer tubular member and having a porous portion serving as the operative filter; and a flexible capillary tube disposed within said plunger tube, one end of said capillary tube extending through said piston head and into said filtering means.

2. The apparatus defined in claim 1 in which said filter means comprises an inverted cup-like member, and a plurality of fitted tablets of filtering media disposed within said cup-like member, at least one of said tablets containing a reagent material which is dispersible in the filtrate liquid after passing through one or more preceding filtering media tablets.

3. The apparatus defined in claim 1 in which said filter means comprises an inverted cup-like member, a plurality of fitted tablets of filtering media disposed within said cup-like member, and a porous tablet composed of a selected reagent material disposed between said tablets of filtering media and the tubular outlet of said cup-like member, whereby the filtered liquid may be treated with the selected reagent.

4. The apparatus defined in claim 1, in which said filter means comprises an inverted cup-like member containing a fitted tablet of filtering medium disposed within said cup-like member.

5. The apparatus defined in claim 4 in which the said cup-like member is integral with said piston head, and communicates with said capillary tube for discharge of filter liquid.

6. An apparatus for separating a clear liquid from suspended solids in the liquid comprising an outer tubular member; a plunger tube longitudinally movable within said outer member; a piston head mounted on the inner end of said plunger tube, said piston head making sliding sealing contact with the inner walls of said outer tubular member; a filtering means disposed forwardly of said piston head; said filtering means being a tubular elongated body of outer cross-sectional diameter smaller than the inner diameter of the outer tubular member and having a porous portion serving as the operative filter; and a flexible capillary tube disposed within said plunger tube, one end of said capillary tube extending through said piston head, and the other end of said capillary tube extending out of the open end of said plunger tube.

7. The apparatus defined in claim 6 in which the outer end of said capillary tube is doubled back so that it communicates with said plunger tube.

References Cited

UNITED STATES PATENTS

| 1,386,340 | 8/1921 | Wuster | 210—359 |
| 2,761,833 | 9/1956 | Ward | 222—189 |
| 3,322,114 | 5/1967 | Portnoy et al. | 128—2 |

MORRIS O. WOLK, Primary Examiner

SIDNEY MARANTZ, Assistant Examiner

U.S. Cl. X.R.

23—258.5, 259; 210—460